United States Patent
Bäcker et al.

(10) Patent No.: US 11,367,334 B2
(45) Date of Patent: Jun. 21, 2022

(54) METHOD AND SYSTEM FOR MONITORING A BASE DEVICE BY MEANS OF A MOBILE TERMINAL

(71) Applicant: Webasto SE, Stockdorf (DE)

(72) Inventors: Christian Bäcker, Stockdorf (DE); Michael Pöhner, Stockdorf (DE); Georg Habbel, Stockdorf (DE); Christian Schweyer, Stockdorf (DE); Markus Beckers, Stockdorf (DE); Andreas Rutsche, Stockdorf (DE); Fritz Wegener, Stockdorf (DE); Martin Zoske, Stockdorf (DE); Michael Schwanecke, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 234 days.

(21) Appl. No.: 16/086,210

(22) PCT Filed: Mar. 21, 2017

(86) PCT No.: PCT/EP2017/056624
§ 371 (c)(1),
(2) Date: Sep. 18, 2018

(87) PCT Pub. No.: WO2017/162626
PCT Pub. Date: Sep. 28, 2017

(65) Prior Publication Data
US 2020/0294383 A1 Sep. 17, 2020

(30) Foreign Application Priority Data
Mar. 22, 2016 (DE) ...................... 10 2016 105 340.6

(51) Int. Cl.
G08B 21/18 (2006.01)
G08B 17/06 (2006.01)
(Continued)

(52) U.S. Cl.
CPC ........... *G08B 21/182* (2013.01); *G08B 17/06* (2013.01); *H04M 11/002* (2013.01); *H04M 11/04* (2013.01)

(58) Field of Classification Search
None
See application file for complete search history.

(56) References Cited

U.S. PATENT DOCUMENTS 6,279,390 B1 * 8/2001 Oka ........................ F01P 11/14
73/114.68
2003/0098784 A1 5/2003 Van Bosch et al.
(Continued)

FOREIGN PATENT DOCUMENTS

CN 101434221 A 5/2009
CN 11 498 468 A 8/2009
(Continued)

OTHER PUBLICATIONS

International Search Report and Written Opinion in connection with PCT/EP2017/056624 dated Jul. 7, 2017.

*Primary Examiner* — Thomas S McCormack
(74) *Attorney, Agent, or Firm* — Quarles & Brady LLP

(57) ABSTRACT

The present invention relates to a method for monitoring a base device (11), in particular a building or part of a building or a vehicle, by means of a mobile terminal (10), wherein the base device (11) has at least one heating device, in particular with a temperature sensor, comprising the steps: determining a current state of the base device (11) by means of the heating device, in particular comprising determining a current temperature at or in the base device (11) by the temperature sensor of the heating device and/or determining an energy supply of the heating device, checking whether the current state is a normal state or an abnormal state and/or whether the current change in state is a normal change in state or an abnormal change in state, and outputting of (Continued)

Figure 1:
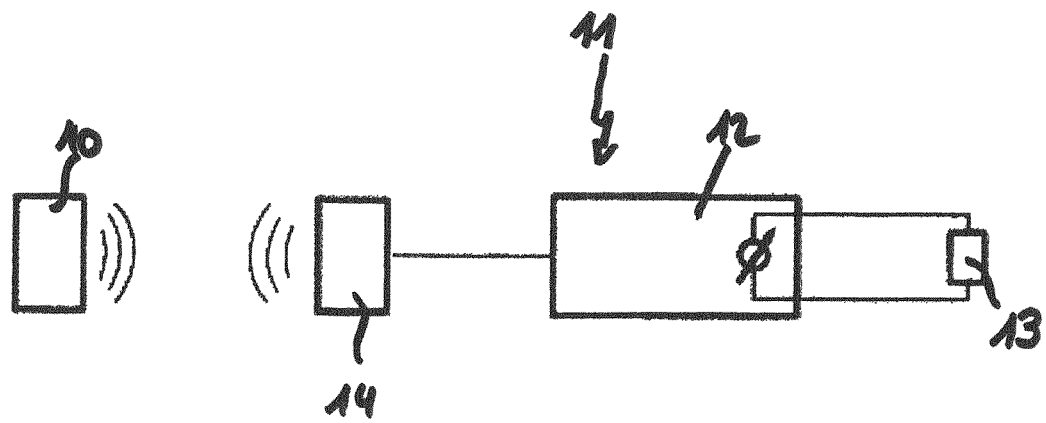

corresponding information to the mobile terminal (10) and/or by said mobile terminal, at least when an abnormal state and/or an abnormal change in state is detected.

15 Claims, 1 Drawing Sheet

(51) Int. Cl.
*H04M 11/00* (2006.01)
*H04M 11/04* (2006.01)

(56) References Cited

U.S. PATENT DOCUMENTS

| | | | |
|---|---|---|---|
| 2008/0042857 A1* | 2/2008 | Gregory | F02C 7/25 340/600 |
| 2008/0217419 A1 | 9/2008 | Ehlers et al. | |
| 2009/0056649 A1 | 3/2009 | MacKenzie | |
| 2011/0115635 A1 | 5/2011 | Petrovski et al. | |
| 2011/0227744 A1* | 9/2011 | Shibata | G07C 5/085 340/679 |
| 2013/0103284 A1* | 4/2013 | Gordon | G01F 23/0076 701/101 |
| 2014/0130574 A1* | 5/2014 | Happ | F24F 11/30 73/31.01 |
| 2014/0266755 A1 | 9/2014 | Arensmeier et al. | |
| 2015/0022339 A1 | 1/2015 | Yoky et al. | |
| 2015/0096352 A1 | 4/2015 | Peterson et al. | |
| 2016/0006285 A1 | 1/2016 | Lee | |
| 2016/0090105 A1* | 3/2016 | Neubecker | A62C 3/07 701/23 |
| 2016/0290668 A1* | 10/2016 | Taylor | F24F 11/62 |

FOREIGN PATENT DOCUMENTS

| | | |
|---|---|---|
| CN | 101498468 A | 8/2009 |
| CN | 104502531 A | 4/2015 |
| DE | 10 2012 220598 A1 | 5/2014 |
| JP | 2010229867 A | 10/2010 |
| WO | 99/22284 A1 | 5/1999 |
| WO | 01/33149 A1 | 5/2001 |

* cited by examiner

METHOD AND SYSTEM FOR MONITORING A BASE DEVICE BY MEANS OF A MOBILE TERMINAL

CROSS-REFERENCE TO RELATED APPLICATIONS

This application represents the national stage entry of PCT International Application No. PCT/EP2017/056624 filed on Mar. 21, 2017, and claims priority to German Patent Application No. 10 2016 105 340.6 filed on Mar. 22, 2016. The contents of these applications are hereby incorporated by reference as if set forth in their entirety herein.

The invention relates to a method and a system for monitoring a base device by means of a mobile terminal.

Methods and systems for monitoring a base device are known fundamentally. DE 10 2012 220 598 A1 describes a monitoring system for monitoring air parameters in a room and a vapor extraction apparatus for use in a monitoring system of this kind. On the basis of a monitoring result, it is then possible for a filter, windows or doors and air-conveying apparatuses, for example, to be influenced. Moreover, it is also possible for heating systems or air conditioning installations to be adjusted as appropriate.

Additionally, air heaters are known that have a room temperature sensor that is used for regulating the heater. Additionally, operator control elements are known that allow activation of the air heater (of the heating system) using a cell phone. A communication required for this purpose can be provided via the cell phone network. Water heaters also often have a temperature sensor that can be used for controlling or regulating heater operation. In addition, a signal from the temperature sensor can also be used for monitoring overheating. Additionally, water heaters of this kind can often also evaluate a voltage applied to the heater. Fundamentally, operator control elements are additionally known that allow activation of the water heater using a cell phone, the communication required for this purpose being provided via a cell phone network. In this connection, utilization of the functionalities provided by the heater and cell phone components is regarded as worthy of improvement.

It is thus an object of the invention to use the functionalities provided by a base device having a heating device and by a mobile terminal as efficiently as possible.

This object is achieved by the features of claim 1.

In particular, the object is achieved by a method for monitoring a base device, in particular a building or building part or a vehicle, by means of a mobile terminal, wherein the base device has at least one heating device, in particular having a temperature sensor, comprising the steps of:
a) determining a present state of the base device by means of the heating device, in particular comprising determining a present temperature on or in the base device by means of the temperature sensor of the heating device and/or determining a supply of power to the heating device,
b) checking whether the present state is a normal or abnormal state and/or the present change of state is a normal change of state or an abnormal change of state, and
c) outputting applicable information to the and/or by means of the mobile terminal at least in the event of discovery of an abnormal state and/or an abnormal change of state.

A central concept of the invention is to use the structures of a base device having a heating device and of a mobile terminal that are provided anyway (at least fundamentally) for the purpose of monitoring the base device. By way of example, in the case of standard air heaters, e.g. for buildings, the room temperature is measured anyway for the purpose of regulating said air heaters. In this respect, it is also possible for an abnormal change of state (such as e.g. a rise in temperature that cannot be explained naturally) to be measured. A rise of this kind that cannot be explained naturally can then be communicated for example by text message (e.g. SMS or a message service, possibly based on the Internet) or call to a mobile terminal (in particular cell phone call). Thus, applicable information is output (or transmitted) "to the" mobile terminal. It is certainly also conceivable for the "raw data" of a temperature sensor of this kind (or raw data of a determination device for determining a present state of the base device) to be transmitted to a mobile terminal, so that a check on the present state or on the present change of state (as for letter b, earlier on) can take place there. If an abnormal state or an abnormal change of state (for example a rise in temperature that cannot be explained naturally) is then discovered, an applicable output can be provided "by the" mobile telephone (for example visually and/or audibly, for example in text message form and/or by means of a luminous device, such as an LED, for example, and/or by means of a warning tone). In general, the method can be used to discover a fire (that is to say as a fire detection installation).

As also evident from the explanation above, in particular outputting applicable information "to the" mobile terminal is thus supposed to be understood to mean transmitting the result of step b from the base device to the mobile terminal. Outputting information "by means of the" mobile terminal can generally be understood to mean a data output having the result of step b as its content and, specifically, outputting visual and/or audible information to the owner of the mobile terminal (for example an LED lighting or a warning tone or a text message).

In particular if the heating device is a water heating device (water heater), a measurement of the water temperature (cooling water temperature) (often performed anyway) can be used further. As explained above in connection with the measurement of the air temperature, a "rise in the water temperature that cannot be explained naturally" (that is to say an abnormal change of state), for example, can be communicated to a mobile terminal. Alternatively or additionally, however, it is also possible to determine (to measure) a supply of power (in particular an applied voltage) to the heating device. If, by way of example, a rise in the supply of power (rise in voltage) is discovered that indicates a power supplier (e.g. generator) operating (even though the base device should be inactive, for example, since it is in a parked and/or locked state, for example), an abnormal change of state of this kind can be output as appropriate (for example by text message or call to the mobile terminal). The vehicle supply voltage, in particular the time profile thereof, can also be used for rating the technical state of the starter battery or of the generator: if the voltage drops e.g. below 9.5 V during starting, the battery needs replacing soon; if the voltage is e.g. below 13.5 V while the vehicle is traveling, the generator is faulty.

In general, a "normal state" is understood to mean in particular a state adopted during standard operation of the base device. Predetermined normal states of this kind may or can be stored (e.g. on an electronic storage medium) (for example after a separate method step for stipulating normal states). A normal state may be defined by a particular temperature of e.g. 25° C., for example. A multiplicity of normal states may then be defined by a temperature range, e.g. from 0° C. to 40° C., for example. Additionally, a normal state can be distinguished in that the base device is deemed to have become operative and at the same time the heating device is supplied with power, for example. If, by contrast, the base device is not deemed to be operating (e.g. because it is locked) and if the heating device is nevertheless supplied with power, there is an abnormal state that may allow a theft to be inferred. Additionally, a "normal change of state" is intended to be understood to mean in particular a change of state that can occur during standard operation of the base device. Predetermined normal changes of state of this kind may or can be stored (e.g. on an electronic storage medium) (for example by means of a separate method step of stipulating normal changes of state). Additionally, a normal change of state may be distinguished in that the base device is deemed to have become operative and at the same time a predetermined rise in a supply voltage for the heating device is determined, for example. If, by contrast, the base device is not deemed to be operating (e.g. because it is locked) and if a rise in voltage can nevertheless be discovered, there is an abnormal state that may allow a theft to be inferred.

A present state is intended to be understood to mean in particular an actual state of the base device. By way of example, a present state can be understood to mean the present temperature measured (by a temperature sensor) or the currently determined state of a supply of power (for example an applied voltage). A present change of state is accordingly a comparison between the present state and a state from the past (for example the state determined immediately beforehand). In general, the change of state can be ascertained by forming a difference between the present state and a previous (in particular the immediately previous) state and/or by forming a differential and/or a quotient (from the present state and the preceding, in particular immediately preceding, determined state). The relevant period for the determination of the normal or abnormal change of state may be at least two seconds or at least five seconds or at least thirty seconds or at least two minutes and/or no more than five minutes or no more than three minutes, for example.

The temperature sensor can communicate (may be connected) with (to) the other components of the heating device (in particular with (to) a control unit) wirelessly or by wire. For the purpose of controlling, in particular regulating, the heating device, an appropriate control unit may be provided. This may be configured for communication with the mobile terminal.

The aforementioned object is further achieved by a system for monitoring a base device, in particular a building or building part or a vehicle, by means of a mobile terminal, wherein the base device has at least one heating device, in particular having a temperature sensor, comprising:

- at least one determination device for determining a present state of the base device by means of the heating device, in particular comprising determining a present temperature on or in the base device by means of the temperature sensor of the heating device and/or determining a supply of power to the heating device,
- a checking device for checking whether the present state is a normal or abnormal state and/or the present change of state is a normal change of state or an abnormal change of state, and
- an output device for outputting applicable information to the and/or by means of the mobile terminal at least in the event of discovery of an abnormal state and/or an abnormal change of state.

The aforementioned object is additionally achieved by a computer-readable storage medium, in particular of a mobile terminal, preferably cell phone, containing instructions that prompt at least one processor to implement a method of the type described above when the instructions are executed by the processor.

In step a, in particular a room temperature of a room, in particular inside the building, is measured, wherein an abnormal state is discovered in the event of a predetermined room temperature being exceeded and/or an abnormal change of state is discovered in the event of a predetermined change of room temperature, in particular a predetermined rise in room temperature, being exceeded. In this connection, a maximum temperature of, by way of example, no more than 50° or no more than 40° can be stipulated, with a normal ("admissible") state obtaining below this maximum temperature and an abnormal state above this maximum temperature. As a result, a fire or blaze can be detected in a simple manner, for example. Alternatively or additionally, a limit value for an "admissible" change of state can also be defined. This limit value may be ≤1° C. per 5 minutes or ≤1° C. per minute, for example. Below this limit value, there may be a normal state, and above this limit value an abnormal state. As a result, a fire or similar undesirable heating can be discovered particularly reliably.

In an alternative embodiment, in step a a cooling fluid temperature (preferably cooling water temperature) in particular inside a motor vehicle can be measured, wherein an abnormal state can be discovered in the event of a predetermined cooling fluid temperature (cooling water temperature) being exceeded and/or an abnormal change of state can be discovered in the event of a predetermined rise in cooling fluid temperature (rise in cooling water temperature) being exceeded.

The predetermined cooling fluid temperature is 40° C. (or less) or 80° C. (or less), for example. The predetermined rise in cooling fluid temperature may be 5° C. per minute (or less) or 10° C. per minute (or less), for example.

The "heating device" may be a device that is provided and intended for heating a room or a heat transfer medium (e.g. heat transfer fluid) (in a desired manner).

Monitoring the cooling fluid temperature, for example inside a motor vehicle, allows at least indirect inference of a theft, for example if the vehicle is actually in a "parked" state (that is to say is locked) and nevertheless detection of an increased temperature allows operation of the vehicle to be inferred. In this respect, theft prevention can be improved in this case.

Alternatively or additionally, in step a a voltage applied to the heater can be measured, wherein an abnormal state can be discovered in the event of a predetermined voltage being exceeded and/or an abnormal change of state can be discovered in the event of a predetermined rise in voltage being exceeded. This also advantageously allows a theft warning to be provided, for example if a rise in voltage indicates a generator operating even though a motor vehicle should actually be "idle". The predetermined voltage may be 10 V (or less) or 30 V (or less), for example. The predetermined rise in voltage may be 5 V per second (or less) or 10 V per second (or less), for example. In any case, the possibility of discovering a theft is improved.

Discovery of an abnormal state can result in an automatic call and/or a text message being sent to the mobile terminal. Alternatively or additionally, discovery of an abnormal state can result in a visual and/or audible warning being generated in the mobile terminal, (for example by means of a computer program or an "app" installed therein).

Steps a and/or b and/or c can preferably be initiated by an input into the mobile terminal. By way of example, computer software (app) of a mobile terminal (cell phone) can preferably be used to form one or more of steps a to c of the method.

In one embodiment, step b and/or c is performed by the mobile terminal, for example a piece of computer software (app) stored therein. In this embodiment, "only" the raw data are transmitted to the mobile terminal in step a, so that said mobile terminal can be used to determine and output, according to steps b and c, whether there is abnormal state or an abnormal change of state. Alternatively or additionally, step b and/or c can be performed by the base device. In such a case, there is then "only" a piece of information transmitted to the mobile terminal in step c indicating that a normal or abnormal or a normal or abnormal change of state has been discovered. A transmission of this kind can then be effected by means of text messages or a call or the like, for example. In any case, an abnormal state or an abnormal change of state can be effectively determined and output. In specific embodiments, the present state and/or the present change of state can be checked for the possibility of a fire and/or a theft.

The system for monitoring the base device can have at least one temperature sensor for determining a room temperature and/or at least one (temperature) sensor for determining a temperature of a heat transfer medium (e.g. cooling fluid temperature, in particular cooling water temperature) and/or at least one determination device for determining a supply of power, in particular voltage, applied to the heater and/or a device for capturing and/or evaluating a GPS signal and/or a device for capturing and/or evaluating an air pressure signal.

Additionally, the system can have a transmission device (transmission module, in particular cell phone module) that can be used to transmit data and/or information to the mobile terminal, in particular cell phone.

The mobile terminal is preferably a cell phone (in particular smartphone). In general, the mobile terminal may be a device for receiving a signal (e.g. telephone number, landline number, police) emitted by the heater.

The checking device and/or the output device may be part of the base device and/or of the mobile terminal.

Further embodiments are obtained from the subclaims.

Figure 2:
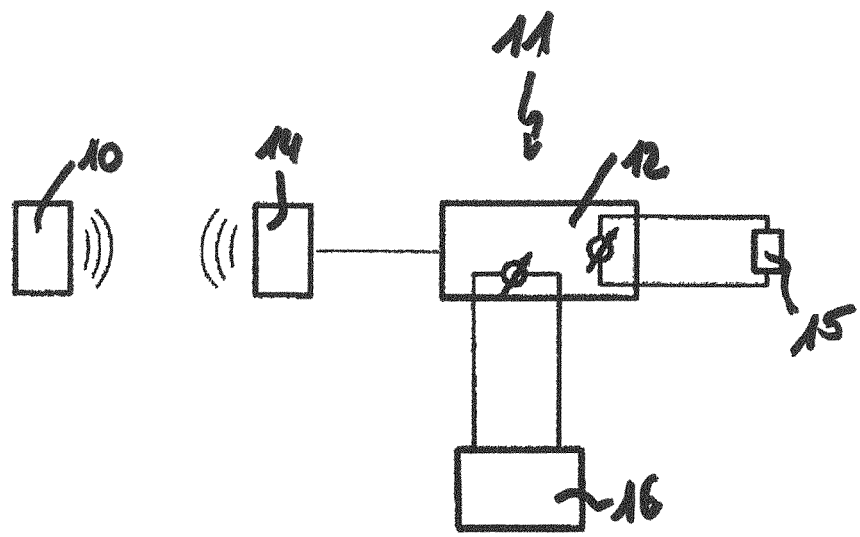

The invention is described below on the basis of exemplary embodiments, which are explained in more detail on the basis of the figures, in which:

FIG. 1: shows a schematic view of a first system for monitoring a base device; and FIG. 2: shows a schematic view of a second system for monitoring a base device.

In the description below, the same reference numerals are used for parts that are the same and have the same action.

FIG. 1 shows a cell phone 10 and a base device 11, comprising a heating device for raising the temperature of a room.

The base device 11 comprises a controller 12 and also a room temperature sensor 13 and a cell phone module 14. The room temperature sensor 13 can be used to determine the room temperature. The determined temperature can be used by the controller to control, in particular regulate, the air temperature of the room, for example. Additionally, the cell phone module 14 can be used to transmit data and information to the mobile terminal 10 (cell phone). This transmission can involve the "raw data" of the room temperature sensor 13 and/or a result of a calculation, for example by the controller 12, of the extent to which a present state is a normal or abnormal state and/or a present change of state is a normal or abnormal change of state, for example.

If the measured temperature exceeds a particular value and/or if a present rise in temperature (generally: change of temperature) exceeds a particular value, this can be used to infer the presence of a fire or a fault, which can accordingly be displayed using the mobile terminal 10.

In the second example shown in FIG. 2, monitoring for the potential discovery of a theft is illustrated. The mobile terminal 10 is in this case again preferably a cell phone. The base device 11 comprises a cell phone module 14, a water temperature sensor 15, a controller 12 and a (vehicle) battery 16. Analogously to the first embodiment, the cell phone module can be used to transmit data and/or information to the mobile terminal 10. If the water temperature sensor now measures a comparatively high temperature value or the measured values of the water temperature sensor are used to measure a comparatively fast rise (which cannot be explained naturally) in the temperature, for example, this can be used to infer the presence of an abnormal state or an abnormal change of state, in particular if the base device has been parked and/or locked or has otherwise been put into an idle state. Generally, a determination device may also be provided (not depicted in the figures) that determines whether the base device should be operating or not operating (for example whether the base device is locked or operational). This can also be defined for the monitoring, e.g. using the cell phone.

If a water temperature sensor measures a comparatively high temperature or the values of the water temperature sensor are used to measure a comparatively fast rise in temperature, this can be used to infer a theft. Alternatively or additionally, the determination of a rise in voltage, which indicates a generator operating, for example, can be used to infer a theft. The cell phone module 14 can then be used to transmit the information that a theft is taking place (generally: that the base device is in abnormal state or that there is an abnormal change of state) to the mobile terminal 10, for example. Alternatively or additionally, it may also be possible for only the "raw data" from the determination of the voltage and/or of the water temperature to be transmitted to the mobile terminal 10 and for these values to be checked by the mobile terminal 10 (cell phone) to determine whether a theft has taken place (or there is an abnormal state and/or an abnormal change of state).

At this juncture, it should be pointed out that all parts described above taken on their own and in any combination, in particular the details depicted in the drawings, are claimed as essential to the invention. Amendments thereto are familiar to a person skilled in the art.

REFERENCE SIGNS

10 Mobile terminal (cell phone)
11 Base device
12 Controller
13 Room temperature sensor
14 Cell phone module
15 Water temperature sensor
16 Vehicle battery

The invention claimed is:

1. A method for monitoring a vehicle by means of a mobile terminal, wherein the vehicle has at least one heating device having a temperature sensor, comprising the steps of:
   a) determining a present state of the vehicle by determining a present temperature on or in the vehicle with the temperature sensor of the heating device and/or determining a supply of power to the heating device, b) checking whether the present state is a normal change of state or an abnormal change of state, the abnormal change of state being ascertained by forming a difference, and/or a differential, and/or a quotient from the present state of the vehicle and a preceding determined state of the vehicle_and c) outputting applicable information to the and/or with the mobile terminal at least in the event of discovery of an abnormal change of state, wherein the present state and/or the present change of state is checked for the possibility of a theft.

2. The method as claimed in claim 1 wherein in step a) a cooling fluid temperature inside the vehicle is measured, wherein an abnormal state is discovered in the event of a predetermined cooling fluid temperature being exceeded and/or an abnormal change of state is discovered in the event of a predetermined rise in cooling fluid temperature being exceeded.

3. The method as claimed in claim 1, wherein in step a) a voltage applied to the heater is measured, wherein an abnormal state is discovered in the event of a predetermined voltage being exceeded and/or an abnormal change of state is discovered in the event of a predetermined rise in voltage being exceeded.

4. The method as claimed in claim 1, wherein discovery of an abnormal state results in an automatic call and/or a text message being sent to the mobile terminal and/or discovery of an abnormal state results in a visual and/or audible warning being generated in the mobile terminal, e.g. by means of an application installed therein.

5. The method as claimed in claim 1, wherein step a) and/or b) and/or c) is initiated by an input into the mobile terminal.

6. The method as claimed in claim 1, wherein step b) and/or c) are performed by the mobile terminal or the vehicle.

7. A system for monitoring a vehicle with a mobile terminal, wherein the vehicle has at least one heating device having a temperature sensor, comprising:

at least one determination device for determining a present state of the vehicle with the heating device comprising determining a present temperature on or in the vehicle with the temperature sensor of the heating device and/or determining a supply of power to the heating device, a checking device for checking whether the present change of state is a normal change of state or an abnormal change of state, wherein the change of state is ascertained by forming a difference, and/or a differential, and/or a quotient from the present state of the vehicle and a preceding determined state of the vehicle_ and an output device for outputting applicable information to the mobile terminal and/or with the mobile terminal at least in the event of discovery of an abnormal change of state, wherein the present state and/or the present change of state is checked for the possibility of a theft.

8. The system as claimed in claim 7, wherein at least one temperature sensor for determining a cooling fluid temperature and/or at least one determination device for determining a supply of power applied to the heater is provided.

9. The system as claimed in claim 7, wherein the mobile terminal is a cell phone.

10. The system as claimed in claim 7, wherein the checking device and/or the output device are part(s) of the vehicle and/or of the mobile terminal.

11. A storage medium containing instructions that prompt at least one processor to implement a method as claimed in claim 1 when the instructions are executed by the processor.

12. The method of claim 2, wherein the cooling fluid temperature is a cooling water temperature.

13. The system as claimed in claim 8, wherein the determination device for determining a supply of power determines a voltage.

14. The method as recited in claim 1, wherein the present state and/or the present change of state is checked for the possibility of a fire.

15. The system as claimed in claim 7, wherein the present state and/or the present change of state is checked for the possibility of a fire.

* * * * *

UNITED STATES PATENT AND TRADEMARK OFFICE
CERTIFICATE OF CORRECTION

PATENT NO. : 11,367,334 B2
APPLICATION NO. : 16/086210
DATED : June 21, 2022
INVENTOR(S) : Christian Backer et al.

It is certified that error appears in the above-identified patent and that said Letters Patent is hereby corrected as shown below:

In the Specification

Column 4, Line 24, "step a cooling" should be --step a a cooling--.

Signed and Sealed this
Second Day of January, 2024

Katherine Kelly Vidal
*Director of the United States Patent and Trademark Office*